(12) United States Patent
Inaba (10) Patent No.: US 11,151,966 B2
(45) Date of Patent: Oct. 19, 2021

(54) DISPLAY CONTROL APPARATUS, DISPLAY CONTROL METHOD AND STORAGE MEDIUM FOR DETERMINING WHETHER OR NOT INFORMATION OF AN IMAGE NEEDS TO BE REDUCED BASED ON VEHICLE INFORMATION

(71) Applicant: Toyota Jidosha Kabushiki Kaisha, Toyota (JP)

(72) Inventor: Chihiro Inaba, Nerima-ku (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/707,203

(22) Filed: Dec. 9, 2019

(65) Prior Publication Data
US 2020/0193941 A1     Jun. 18, 2020

(30) Foreign Application Priority Data
Dec. 13, 2018   (JP) .............................. JP2018-233851

(51) Int. Cl.
*G09G 5/373*     (2006.01)
*G09G 5/30*      (2006.01)
(Continued)

(52) U.S. Cl.
CPC .......... *G09G 5/373* (2013.01); *G06K 9/6267* (2013.01); *G09G 5/30* (2013.01); *B60K 35/00* (2013.01); *B60K 2370/166* (2019.05); *B60K 2370/167* (2019.05); *B60K 2370/176* (2019.05); *B60K 2370/186* (2019.05); *B60K 2370/52* (2019.05);
(Continued)

(58) Field of Classification Search
None
See application file for complete search history.

(56) References Cited

U.S. PATENT DOCUMENTS

2003/0055537 A1*   3/2003   Odinak ................ G01C 21/367
                                                                701/1
2010/0171767 A1*   7/2010   Waeller .................. B60K 35/00
                                                              345/672
(Continued)

FOREIGN PATENT DOCUMENTS

CN         104969286 A     10/2015
DE    102018130821 A1 *    6/2020   ......... G06K 9/00791
(Continued)

*Primary Examiner* — Patrick F Valdez
(74) *Attorney, Agent, or Firm* — Oblon, McClelland, Maier & Neustadt, L.L.P.

(57) ABSTRACT

A display control apparatus according to an embodiment of the present disclosure is a display control apparatus that displays an image on a display unit equipped on a vehicle, the display control apparatus including an image display unit that determines whether or not an amount of information of a first image to be displayed on the display unit equipped on the vehicle needs to be reduced based on vehicle information obtained from the vehicle, displays the first image on the display unit when the amount of the information of the first image does not need to be reduced, and displays a second image an amount of information of which is smaller than the amount of the information of the first image in place of the first image on the display unit when the amount of the information of the first image needs to be reduced.

18 Claims, 8 Drawing Sheets

(51) Int. Cl.
   *G06K 9/62*   (2006.01)
   *B60K 35/00*   (2006.01)
(52) U.S. Cl.
   CPC . *G09G 2320/0613* (2013.01); *G09G 2340/14* (2013.01); *G09G 2380/10* (2013.01)

(56) References Cited

U.S. PATENT DOCUMENTS

| | | | | |
|---|---|---|---|---|
| 2012/0179325 | A1* | 7/2012 | Faenger | B60K 35/00 701/31.4 |
| 2015/0051752 | A1* | 2/2015 | Paszkowicz | B60W 40/08 701/1 |
| 2017/0212910 | A1* | 7/2017 | Morris | G06T 7/70 |
| 2017/0269364 | A1* | 9/2017 | Fujita | B60K 37/04 |

FOREIGN PATENT DOCUMENTS

| | | | |
|---|---|---|---|
| JP | 10-255017 A | | 9/1998 |
| JP | 2001-307298 A | | 11/2001 |
| JP | 2002-162236 A | | 6/2002 |
| JP | 2004053346 A | * | 2/2004 |
| JP | 2004-109351 A | | 4/2004 |
| JP | 2004-213489 A | | 7/2004 |
| JP | 2007-096392 A | | 4/2007 |
| JP | 2009-229385 A | | 10/2009 |
| JP | 2010-260483 A | | 11/2010 |
| JP | 2012-025355 A | | 2/2012 |

\* cited by examiner

| KEYWORD | SCORE |
|---|---|
| COW | 9 |
| ANIMAL FAMILY | 9 |
| GRASS FIELD | 6 |
| NATURE PHOTO | 3 |
| ⋮ | ⋮ |

DISPLAY CONTROL APPARATUS, DISPLAY CONTROL METHOD AND STORAGE MEDIUM FOR DETERMINING WHETHER OR NOT INFORMATION OF AN IMAGE NEEDS TO BE REDUCED BASED ON VEHICLE INFORMATION

INCORPORATION BY REFERENCE

The disclosure of Japanese Patent Application No. 2018-233851 filed on Dec. 13, 2018 including the specification, drawings and abstract is incorporated herein by reference in its entirety.

BACKGROUND

1. Technical Field

The present disclosure relates to a display control apparatus and a display control program for displaying an image on a display unit equipped on a vehicle.

2. Description of Related Art

Japanese Patent Application Publication No. 2004-109351 discloses a technology of making an image displayed on a screen of a display unit hidden when a travelling speed of a vehicle exceeds a threshold.

SUMMARY

However, there can be a case where convenience decreases when an image displayed on a screen is hidden as in the technology disclosed in JP 2004-109351 A, and in such a case, this is not desirable.

The present disclosure has been devised in view of the aforementioned circumstances, and an object thereof is to provide a display control apparatus capable of improving convenience.

In order to solve the aforementioned problem, an embodiment of the present disclosure provides a display control apparatus that displays an image on a display unit equipped on a vehicle. The display control apparatus includes an image display unit that determines whether or not an amount of information of a first image to be displayed on the display unit equipped on the vehicle needs to be reduced based on vehicle information obtained from the vehicle, displays the first image on the display unit when the amount of the information of the first image does not need to be reduced, and displays a second image, an amount of information of the second image being smaller than the amount of the information of the first image in place of the first image on the display unit when the amount of the information of the first image needs to be reduced.

According to the embodiment, the second image is provided in place of the first image when the amount of the information of the first image needs to be reduced, and convenience can be improved.

In the embodiment, the first image may be a first text image indicating a appearance of a sentence, and the second image may be a second text image indicating an appearance of a sentence obtained by summarizing the sentence.

According to the embodiment, since the second text image is provided in place of the first text image when the amount of the information of the first text image needs to be reduced, cognitive load of the text image on a driver is reduced as compared with the case of displaying a text appearance of a long sentence, and convenience can be restrained from significantly decreasing.

In the embodiment, the first image may be a first picture image indicating an image of at least one of a shape, a diagrammatic figure and a video image other than a text, and the second image may be a second picture image indicating an image obtained by summarizing the image of at least one of a shape, a diagrammatic figure and a video image other than a text.

According to the embodiment, since the second picture image is provided in place of the first picture image when the amount of the information of the first picture image needs to be reduced, cognitive load of the picture image on a driver is reduced as compared with the case of displaying a detailed picture image, and convenience can be restrained from significantly decreasing.

In the embodiment, the image display unit may determine whether or not a second image group composed of a plurality of the second images that are sorted out into a plurality of categories includes one corresponding to the first image, and may display the second image corresponding to the first image on the display unit.

According to the embodiment, a process of processing first image information or the similar process can be eliminated, so that determination processing of the image display unit can be relieved. Accordingly, the second image can be generated without an expensive high performance processor, which can reduce production costs of the display control apparatus while enhancing the speed of image display.

In the embodiment, the image display unit may determine whether or not the amount of the information of the first image needs to be reduced using the vehicle information and a classifier that classifies a feature value of an image.

According to the embodiment, the contents of various types of text images and picture images can be classified regardless of complexities and genres of the images. Therefore, for various types of text images and picture images, an abstracted image to reduce cognitive load on a driver can be easily generated, and the second image corresponding to the first image can be displayed with high accuracy.

In the embodiment, the classifier may be composed of a pre-trained neural network.

According to the embodiment, an appropriate images can be quickly classified in accordance with information of the feature value of the input first image.

Another embodiment of the present disclosure can be realized as a display control program.

According to the present disclosure, convenience can be improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereafter, embodiments for implementing the disclosure are described with reference to the drawings.

Figure 1:
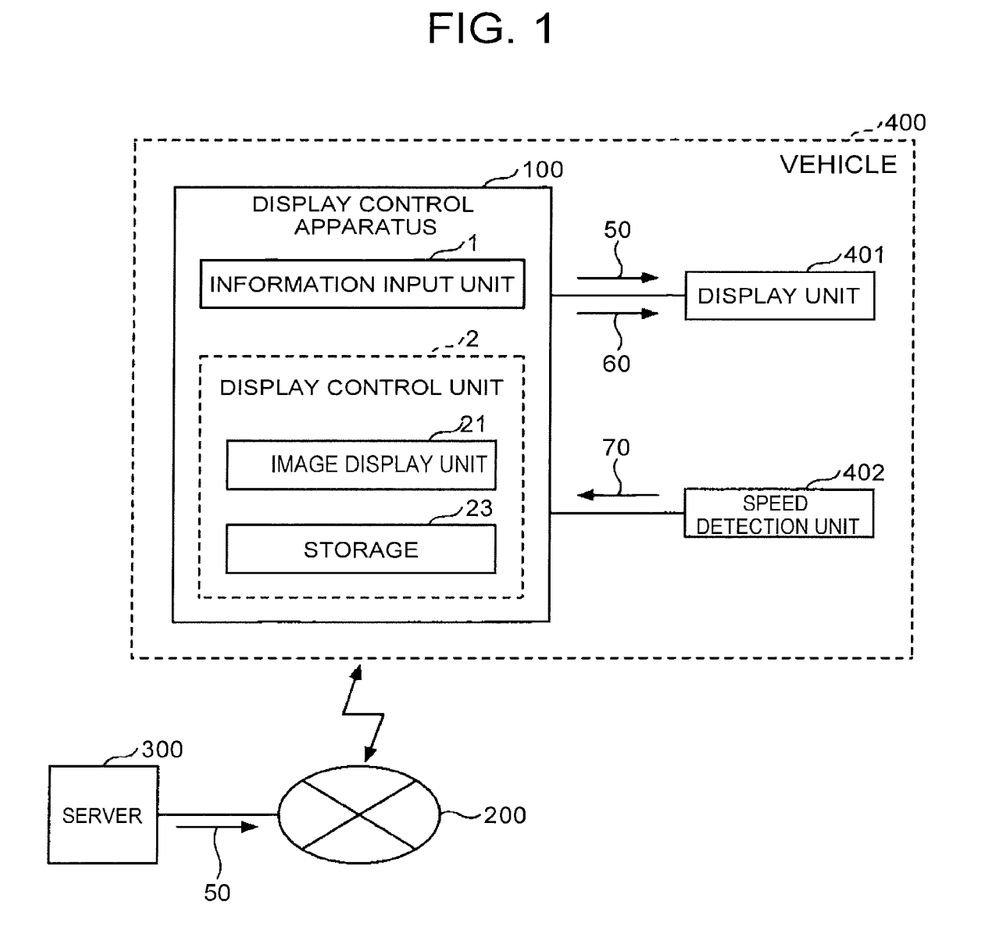
FIG. 1 is a diagram showing an exemplary configuration of a display control apparatus according to an embodiment of the present disclosure.

FIG. 1 is a diagram showing an exemplary configuration of a display control apparatus according to an embodiment of the present disclosure. A vehicle 400 shown in FIG. 1 is provided with a display unit 401, and a display control apparatus 100 according to the present embodiment. The display unit 401 is exemplarily a center display, a meter display, a head mounted display, a display of a navigation apparatus, or the like. The display unit 401 displays a first image based on first image information 50, and displays the first image based on second image information 60. The first image information 50 is information for generating the first image which can be displayed on the display unit 401, and is distributed from a server 300 shown in FIG. 1. The first image is any of a still image and a moving image. The first image is exemplarily an image created by a vehicle manufacturer, a third party or the like, an image posted to a video site on the Internet, or the like. The third party is a content provider or the like which provides various services regarding businesses for vehicles except vehicle manufacturing businesses. The first image may include an image which can be displayed on an image display medium other than the display unit 401 as well as information oriented to display on the display unit 401. Examples of the image display medium include a TV set, a display screen of a smartphone, a display attached to a personal computer, a display screen of a game machine, and an electric bulletin board.

Figure 2:
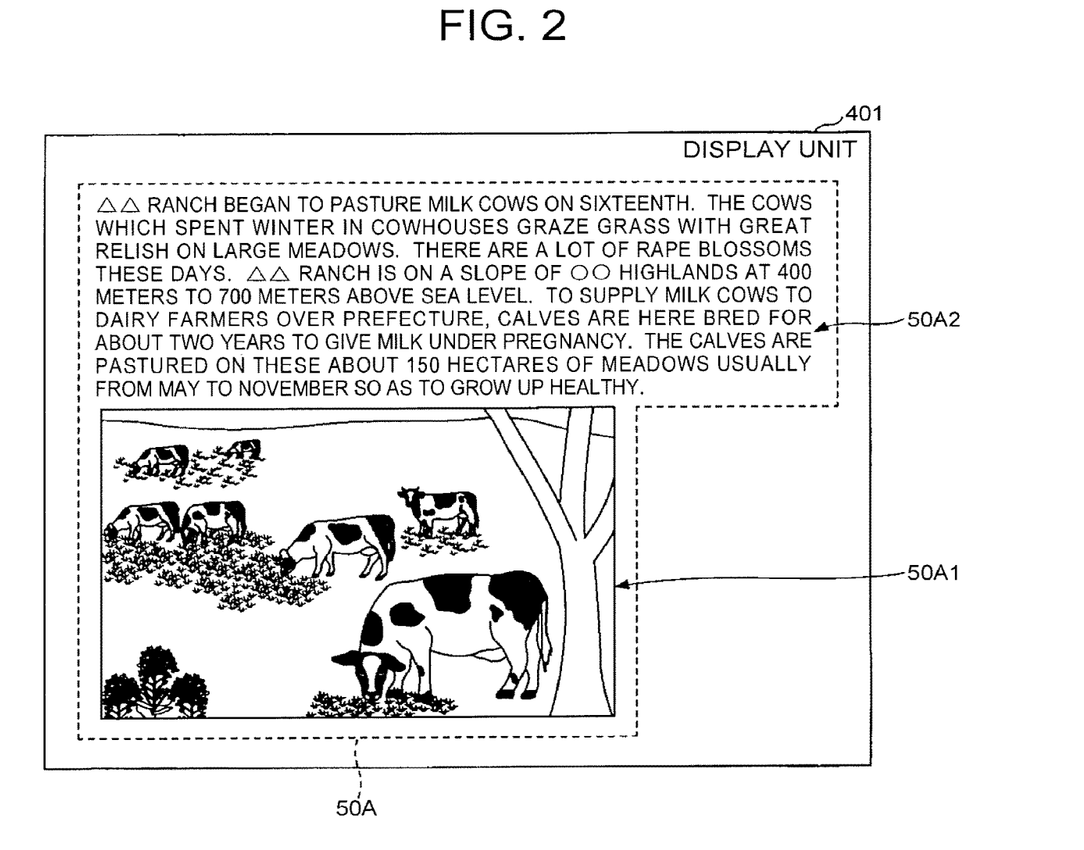
FIG. 2 is a diagram exemplarily showing a first image displayed on a display unit shown in FIG. 1.

Specific examples of the first image are described using FIG. 2. FIG. 2 is a diagram exemplarily showing the first image displayed on the display unit shown in FIG. 1. A first image 50A shown in FIG. 2 is exemplarily an image displayed when an official HP is accessed which is established by a company managing a ranch which is a destination of the vehicle 400 shown in FIG. 1. The first image 50A shown in FIG. 2 includes two types of images (a first picture image 50A1 and a first text image 50A2). A "picture image" is a picture of at least one of a shape, a diagrammatic figure and a video image other than characters (i.e. text). The "picture image" may be any of a still picture and a moving picture.

A text image is an image having at least one character visualized. The first text image 50A2 shown in FIG. 2 is an image representing sentences, and an image exemplarily representing a detailed caption regarding the ranch. The first text image 50A2 may be an image representing characters (text) imaged by an imaging device, or may be an image representing characters created by a computer, an image representing characters displayed in start-up of an application, an image representing characters displayed on a Web content, or the like.

When the first text image 50A2 is described in some lines and this first text image 50A2 is displayed on the display unit 401 in the travelling vehicle 400, it can disturb driving of a driver since it can take a long time for the driver to complete the understanding of the sentences even in a large font of the characters. Moreover, when the first picture image 50A1 represents an object in a complex pattern or shape, or an amount of information of the first picture image 50A1 is large, it can also disturb the driving since it takes a longer time for a browser to complete the correct understanding of the content of the image than a time taken at a stop of the vehicle. As above, in the travelling vehicle 400, cognitive load on a driver tends to more increase in terms of understanding of the content of the first image 50A as the amount of the information of the first image 50A becomes larger. As a technique for reducing such an increase of the cognitive load, there can be considered a method of forcibly putting such a displayed image in an undisplayed state. Nevertheless, it is not always desirable to put the image in the undisplayed state since understandability decreases as a whole due to a loss of desired information along with a decrease in the amount of the information of the image. In consideration of such circumstances, the display control apparatus 100 according to the present embodiment is configured such that image information can be continuously provided while an increase of cognitive load on a driver being reduced. Hereafter, an exemplary configuration of the display control apparatus 100 is described, and then operations of the display control apparatus 100 are sequentially described.

Returning to FIG. 1, the display control apparatus 100 includes an information input unit 1 into which the first image information 50 indicating the content of the first image is input, and a display control unit 2. The information input unit 1 is an interface for sending and receiving information to/from a communication network 200 in wireless communication or wired communication. The communication network 200 is the Internet, a mobile terminal communication network or the like.

The display control unit 2 includes a image display unit 21 and a storage 23. The image display unit 21 displays the first image 50A generated based on the first image information 50 on the display unit 401 when a travelling speed of the vehicle 400 is less than a specific threshold, and displays a second image generated based on the second image information 60 in place of the first image 50A on the display unit 401 when the travelling speed is not less than the threshold. The second image information 60 is stored in the storage 23. The second image information 60 is image information indicating the content of the second image the amount of the information of which is smaller than the amount of the information of the first image 50A. Examples of displaying the second image are mentioned later. The travelling speed is a vehicle speed detected by a speed detection unit 402 of the vehicle 400, and is transmitted as speed information 70 to the display control apparatus 100 from the speed detection unit 402. Examples of displaying the second image are mentioned later.

Figure 3:
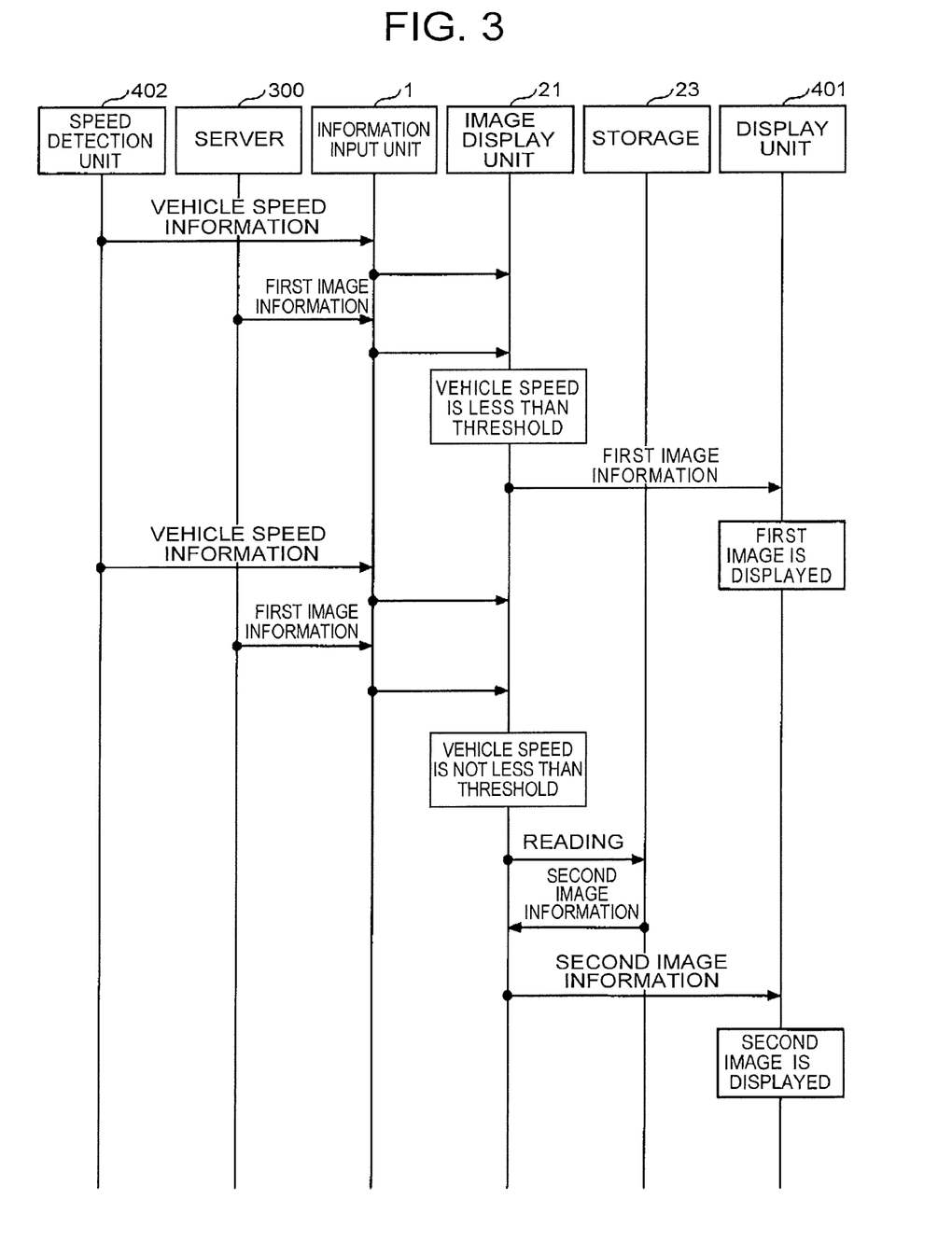
FIG. 3 is a sequence chart for explaining operations of a display control apparatus 100 according to the present embodiment.
Figure 4:
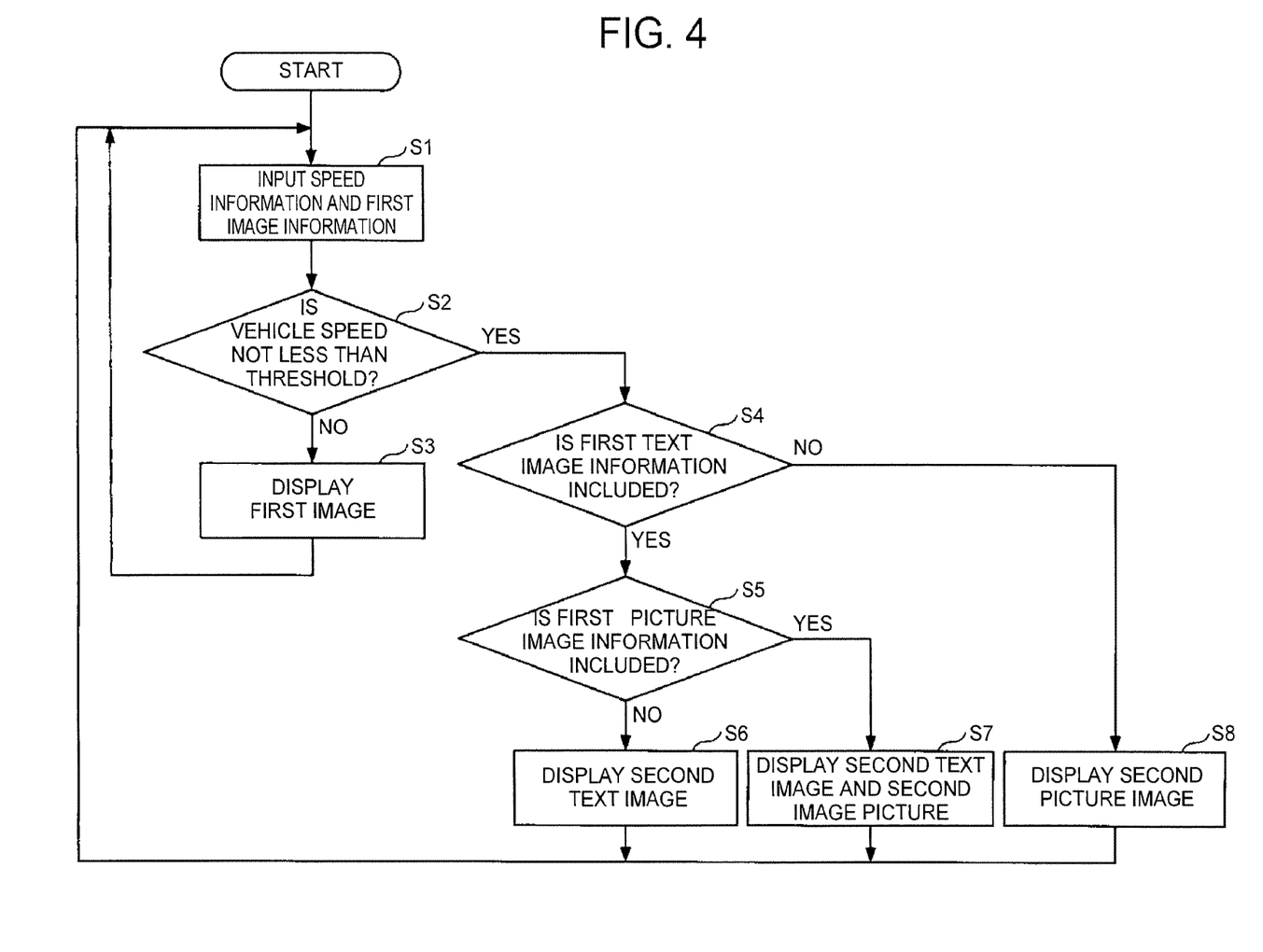
FIG. 4 is a flowchart for explaining the operations of the display control apparatus 100 according to the present embodiment.

Next, operations of the display control apparatus 100 are described using FIG. 3 to FIG. 8. FIG. 3 is a sequence chart for explaining operations of the display control apparatus 100 according to the present embodiment. FIG. 4 is a flowchart for explaining the operations of the display control apparatus 100 according to the present embodiment. The speed information 70 and the first image information 50 are input into the image display unit 21 via the information input unit 1 (step S1).

The image display unit 21 determines whether or not the vehicle speed is less than the threshold based on the speed information 70 and the threshold (step S2). In this determination processing, the vehicle speed and the threshold are compared in their magnitudes with each other. The threshold is a value preset for the vehicle speed determination.

When the vehicle speed is less than the threshold (No in step S2), the image display unit 21 transfers the first image information 50 to the display unit 401. On the display unit 401 into which the first image information 50 is input, the first image 50A as shown in FIG. 2 is displayed based on the first image information 50 (step S3).

Returning to step S2, when the vehicle speed is not less than the threshold (Yes in step S2), the image display unit 21 determines whether or not first text image information is included in the first image information 50 (step S4). The first text image information is information indicating the content of the first text image 50A2.

When the first text image information is included in the first image information 50 (Yes in step S4), the image display unit 21 determines whether or not first picture image information is included in the first picture information 50 (step S5). The first picture image information is information indicating the content of the first picture image 50A1.

When the first picture image information is not included in the first picture information 50 (No in step S5), the image display unit 21 determines that only the first text image information is included in the first image information 50. In this case, the image display unit 21 outputs information including second text image information as the second image information 60 in place of the first image information 50 to the display unit 401. Thereby, a second text image is displayed on the display unit 401 (step S6). The second text image is an image representing a sentence the amount of the information of which is smaller than the amount of the information of the first text image 50A2 shown in FIG. 2. The second text image indicates an appearance of a sentence obtained by summarizing the sentences in the first text image.

Figure 5:
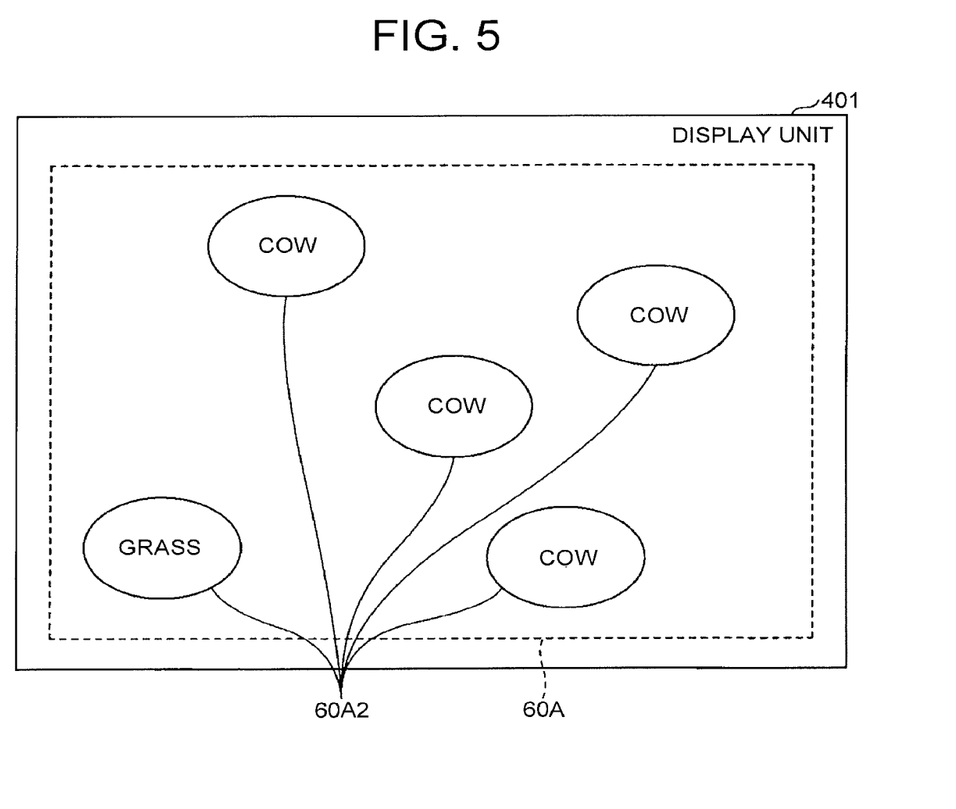
FIG. 5 is a diagram exemplarily showing a second text image displayed in the process of step S6.
Figure 6:
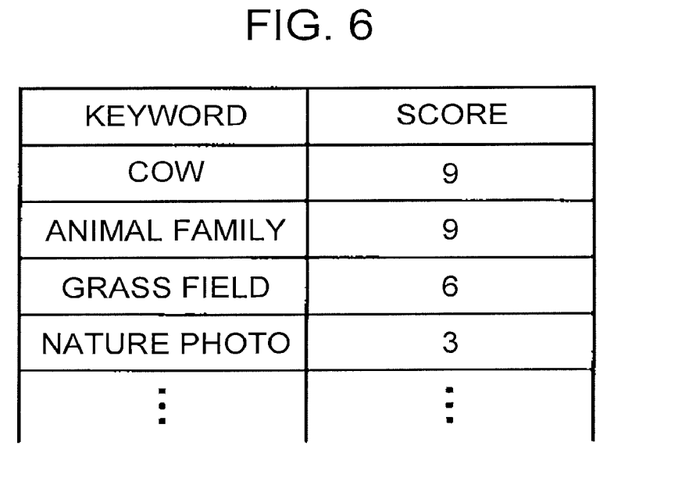
FIG. 6 is a diagram exemplarily showing table information.

FIG. 5 is a diagram exemplarily showing the second text image displayed in the process of step S6. As shown in FIG. 5, a plurality of second text images 60A2 are displayed on the display unit 401. Each second text image 60A2 is exemplarily a second image 60A. Operation of displaying the second text image 60A2 is specifically described. The image display unit 21 acquires the first image information 50 as matrix information. The matrix information includes pixel data and tag data of the second text image 60A2. The tag data is data indicating that pixels of the second text image 60A2 are pixels composing a character. The image display unit 21 which acquires the matrix information estimates the first image to be displayed with the first image information 50 on the display unit 401 based on the pixel data and the tag data, and uses table information in which a keyword corresponding to the estimated image and a score indicating the number of appearances of the keyword are associated with each other. FIG. 6 is a diagram exemplarily showing the table information. The image display unit 21 uses the table information to read an image corresponding to the keyword that has a high score from the storage 23, and with the read image being set as the second text image 60A2, compares the amount of the information of the second text image 60A2 and the amount of the information of the first text image 50A2 with each other. When the amount of the information of the second text image 60A2 is smaller than the amount of the information of the first text image 50A2, the image display unit 21 outputs information of the second text image 60A2 as the second image information 60 to the display unit 401. When the amount of the information of the second text image 60A2 is larger than the amount of the information of the first text image 50A2, the image display unit 21 generates a text image the amount of the information of which is reduced by abstraction from the first text image 50A2. To reduce the amount of the information of an image is to process the image to such an extent that a person can recognize the processed image such that cognitive load on the person can be reduced, but does not necessarily mean to reduce the data size of the image, such as a bit rate. For example, color conversion into an RGB color space, gray scale conversion, and/or magnification on the first image generate the second image. Notably, a technology of generating an image with a reduced amount of the information is disclosed, for example, in Japanese Patent Application Publication No. 10-255017, and its description is omitted. The image display unit 21 outputs information indicating the content of this text image as the second image information 60 to the display unit 401. Thereby, the second text images 60A2 as shown in FIG. 5 are displayed on the display unit 401.

Displaying the second text images 60A2 as above can cause a driver to roughly understand that the destination of the vehicle by way of example has a ranch, woods, a farm and the like while reducing cognitive load on the driver. Moreover, a passenger also understands the content of the displayed information, and lack of such information can be reduced as compared with the case of no displayed images.

Returning to step S5 in FIG. 4, when the first picture image information is included in the first image information 50 (Yes in step S5), the image display unit 21 determines that the first text image information and the first picture image information are included in the first image information 50. In this case, the image display unit 21 outputs information of the second text image and a second picture image as the second image information 60 in place of the first text image 50A2 and the first picture image 50A1 to the display unit 401. Thereby, the second text image and the second picture image are displayed on the display unit 401 (step S7). The second picture image is an image the amount of the information of which is smaller than the amount of the information of the first picture image 50A1 shown in FIG. 2. The second picture image indicates an image obtained by summarizing an image of at least one of a shape, a diagrammatic figure and a video image other than characters.

Figure 7:
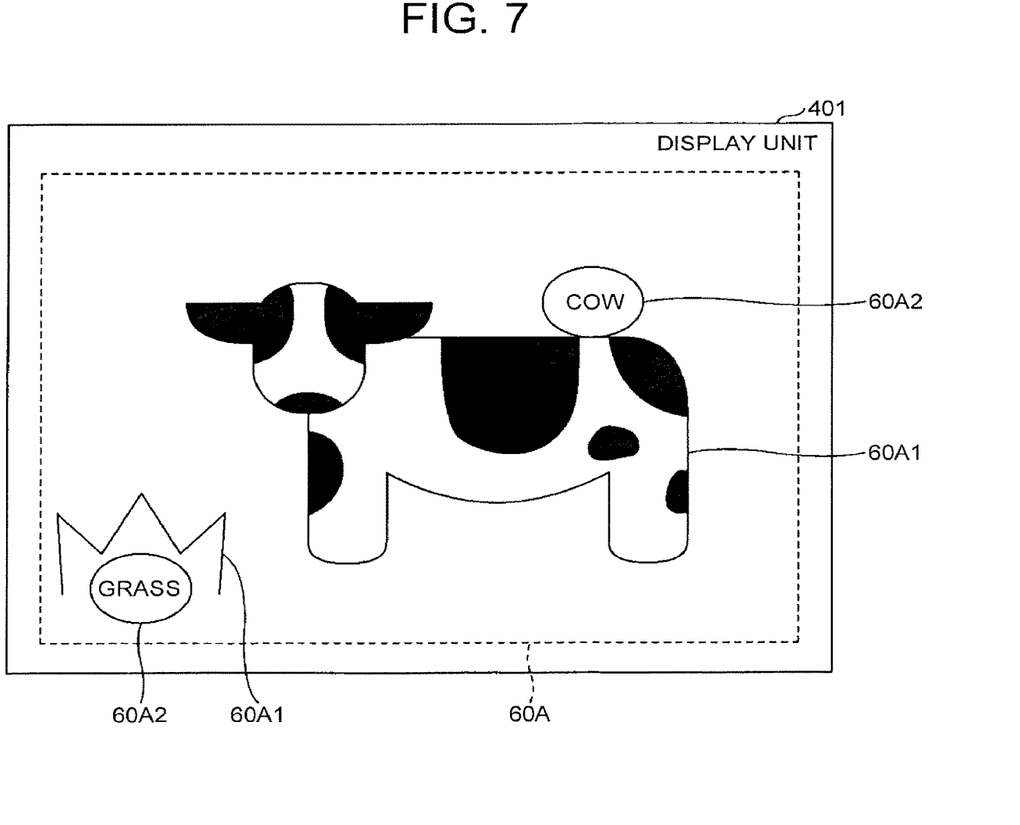
FIG. 7 is a diagram exemplarily showing a second text image and a second picture image displayed in the process of step S7.

FIG. 7 is a diagram exemplarily showing the second text image and the second picture image displayed in the process of step S7. As shown in FIG. 7, a plurality of second text images 60A2 and a plurality of second picture images 60A1 are displayed on the display unit 401. Each of these images is exemplarily the second image 60A. Operation of displaying the second picture image 60A1 is specifically described. The image display unit 21 acquires the first image information 50 as matrix information. The matrix information includes pixel data and tag data of the second picture image 60A1. The tag data is data indicating that pixels of the second picture image 60A1 are pixels composing a character. The image display unit 21 which acquires the matrix information estimates the first image to be displayed with the first image information 50 on the display unit 401 based on the pixel data and the tag data, and uses table information in which a keyword corresponding to the estimated image and a score indicating the number of appearances of the keyword are associated with each other. The image display unit 21 uses the table information to read an image corresponding to the keyword that has a high score form the storage 23, and with the read image being set as the second picture image 60A1, compares the amount of the information of the second picture image 60A1 and the amount of the information of the first picture image 50A1 with each other. When the amount of the information of the second picture image 60A1 is smaller than the amount of the information of the first picture image 50A1, the image display unit 21 outputs information of the second picture image 60A1 to the display unit 401. When the amount of the information of the second picture image 60A1 is larger than the amount of the information of the first picture image 50A1, the image display unit 21 generates a picture image the amount of the information of which is reduced by abstraction from the first picture image 50A1. The image display unit 21 outputs information indicating the content of this picture image which information is added to the text image information generated by the aforementioned method as the second image information 60 to the display unit 401. Thereby, the second text images 60A2 and the second picture images 60A1 as shown in FIG. 7 are displayed on the display unit 401.

Displaying the second text images 60A2 and the second picture images 60A1 as above enables the driver and the passenger to more easily understand the contents of the images displayed on the display unit 401 as compared with the case where only the second text images 60A2 are displayed, so that convenience can be improved while an increase of cognitive load is restrained.

Figure 8:
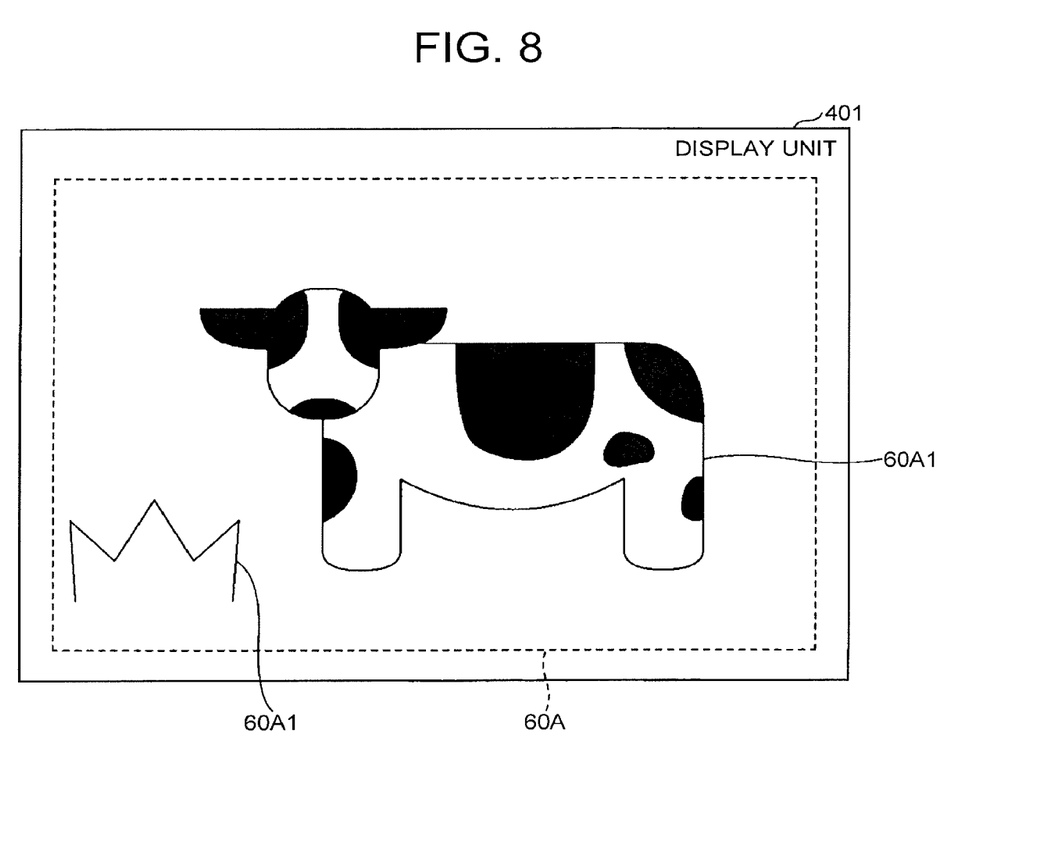
FIG. 8 is a diagram exemplarily showing a second picture image displayed in the process of step S8.

Returning to step S4 in FIG. 4, when the first text image 50A2 is not included in the first image information 50 (Yes in step S4), the image display unit 21 determines that only the first picture image 50A1 is included in the first image information 50. In this case, the image display unit 21 generates the second picture image 60A1 by the method described for step S7, and outputs information of the generated second picture image 60A1 as the second image information 60 to the display unit 401. Thereby, the second picture image 60A1 is displayed on the display unit 401 (step S8). FIG. 8 is a diagram exemplarily showing the second picture image displayed in the process of step S8. As shown in FIG. 8, the plurality of second picture images 60A1 are displayed on the display unit 401.

Displaying the second picture images 60A1 as above can cause a person to intuitively understand the content of display as compared with the case where the second text images 60A2 are displayed as in FIG. 5, so that an increase of cognitive load can be more reduced.

Figure 9:
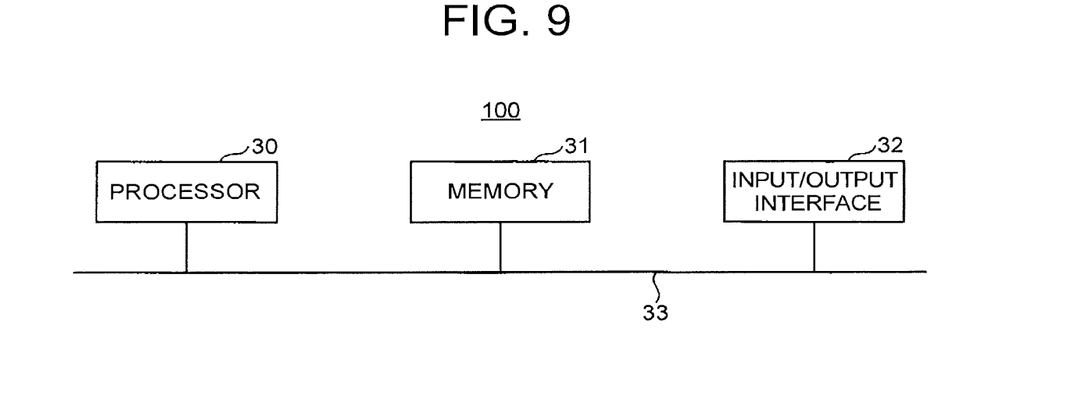
FIG. 9 is a diagram exemplarily showing a hardware configuration for realizing a display control apparatus according to an embodiment of the present disclosure.

FIG. 9 is a diagram exemplarily showing a hardware configuration for realizing a display control apparatus according to an embodiment of the present disclosure. The display control apparatus 100 can be realized by a processor 30 such as a central processing unit (CPU) or a system large scale integration (LSI), a memory 31 composed of a random access memory (RAM), a read only memory (ROM) and the like, and an input/output interface 32. The processor 30, the memory 31 and the input/output interface 32 are connected to a bus 33, and can send and receive information to/from one another via the bus 33. The input/output interface 32 functions as the information input unit 1 through which the display control apparatus 100 sends and receives information to/from the communication network 200. Notably, the processor 30 may be calculation means such as a microcomputer or a general-purpose graphics processing unit (GPU). When the display control apparatus 100 is realized, the image display unit 21 of the display control apparatus 100 is realized by a program for the display control apparatus 100 being stored in the memory 31 and this program being executed by the processor 30. The program for the display control apparatus 100 is a program for performing functions of the image display unit 21. Namely, the program for the display control apparatus 100 is a display control program which causes a computer to execute an information input step of inputting the first image information 50 indicating the content of the first image 50A displayed on the display unit 401 equipped on the vehicle 400, and a display step. The display step is processing of determining whether or not the amount of the information of the first image 50A needs to be reduced based on vehicle information obtained from the vehicle 400, displaying the first image 50A generated based on the first image information 50 on the display unit 401 when the amount of the information of the first image 50A does not need to be reduced, and displaying the second image information 60 indicating the content of the second image 60A the amount of the information of which is smaller than the amount of the information of the first image 50A in place of the first image 50A on the display unit 401 when the amount of the information of the first image 50A needs to be reduced.

Figure 10:
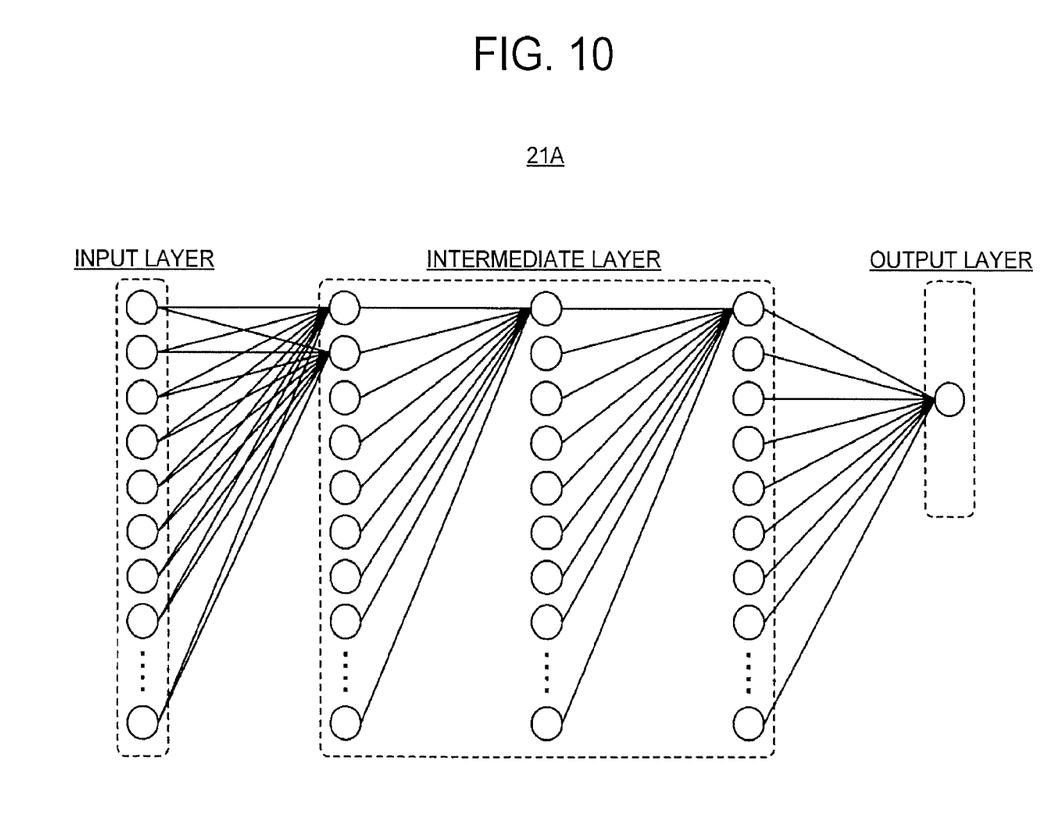
FIG. 10 is a diagram exemplarily showing a neural network applied to a image display unit.

FIG. 10 is a diagram exemplarily showing a neural network applied to an image display unit. A neural network model 21A shown in FIG. 10 is exemplarily the image display unit 21. The neural network model 21A is created through description using a developing language such as "Python" and "TensorFlow". The neural network model 21A has an input layer, intermediate layers called hidden layers, and an output layer. The neural network model 21A employs a configuration of a multilayer structure with an increased number of intermediate layers. For an activation function, the ramp function "ReLU", the linear function "Liner" and the like are used. The activation function means a nonlinear function or a classifying function applied after linear transformation in a neural network. In order to recognize the first image using the neural network model 21A, deep machine learning on the neural network model 21A using image information called tutor data or training data is needed. Since high calculation performance is needed for realizing the neural network model 21A is required, it is desirable to realize the neural network model 21A on the server 300 connected to the communication network 200, not on an in-vehicle computer.

The image display unit 21 may have a configuration of determining whether or not the amount of the information of the first image needs to be reduced using the vehicle information and an classifier which classifies a feature value of an image. Thereby, the contents of various types of text images and picture images can be classified regardless of complexities and genres of the images. Therefore, for various types of text images and picture images, an abstracted image to reduce cognitive load on a driver can be easily generated, and the second image corresponding to the first image can be displayed with high accuracy. By the classified composed of a neural network that has finished learning, the classifier can quickly classify an appropriate feature value that has been learned in accordance with information of the feature value of the input first image. Notably, there can also be used for the classifier techniques such as a support vector machine (SVM) and a scale-invariant feature transform (SIFT) other than a neural network.

While for the present embodiment, an exemplary configuration in the case of generating the second image using image data stored in the storage 23 provided in the display control apparatus 100 has been described, information of the second image stored, for example, in the server 300 may be displayed in place of the image data stored in the storage 23 on the display unit 401. This configuration can reduce the capacity of the memory provided in the vehicle 400, which can reduce production costs of the vehicle 400.

While in the present embodiment, it is determined whether or not the travelling speed of the vehicle 400 is not less than the threshold and the first image or the second image is displayed, vehicle information other than the travelling speed may be used. Such vehicle information other than the travelling speed is exemplarily information indicating the state of a parking brake being operated or the state of the parking brake being released, and/or information acquired from an advanced driver-assistance system (ADAS). The ADAS is a system which assists driving operation of a driver for enhancing convenience in road traffic. Other than or in addition to these pieces of information, the vehicle information other than the travelling speed may be exemplarily information indicating a steering state of a steering apparatus, and/or information indicating the state of brake operation. Namely, the image display unit 21 may have a configuration of determining whether or not the amount of the information of the first image needs to be reduced based on the vehicle information obtained from the vehicle, displaying the first image on the display unit when the amount of the information of the first image does not need to be reduced, and displaying the second image in place of the first image on the display unit when the amount of the information of the first image needs to be reduced. By using the vehicle information other than the travelling speed as above, flexibility in designing the display control apparatus 100 is improved, and vehicle types to which the display control apparatus 100 can be applied can also be increased.

Moreover, the storage 23 of the display control apparatus 100 of the present embodiment may store information of a second image group, for example, composed of a plurality of second images which are sorted out into a plurality of categories. The categories are classifications according to the contents of images to be displayed on the display unit 401 (animals, buildings, nature scenes and the like, for example). In this case, the image display unit 21 may have a configuration of determining whether or not the information of the second image group includes a thing corresponding to the first image information, and displaying the second image generated based on the second image information corresponding to the first image information on the display unit 401. Such a configuration can eliminate a process of processing the first image information or the similar process, so that the determination processing of the image display unit 21 can be relieved. Accordingly, the second image can be generated without an expensive processor high in processing speed, which can reduce production costs of the display control apparatus 100 while enhancing the speed of image display.

The display control apparatus 100 of the present embodiment may have a configuration of changing the amount of the information of the second image stepwise or continuously according to the vehicle speed. For example, the amount of the information of the second image is reduced according to speed ranges such as a low speed range (0 km/h to 30 km/h), a middle speed range (31 km/h to 70 km/h) and a high speed range (71 km/h or more) in the order of the low speed range, the middle speed range and the high speed range. This configuration can more reduce an increase of cognitive load as compared with the case where a image with a fixed amount of the information is displayed relative to the vehicle speed.

What is claimed is:

1. A display control apparatus that displays an image on a display equipped on a vehicle, the display control apparatus comprising:
   circuitry configured to:
   determine whether or not an amount of information of a first image to be displayed on the display equipped on the vehicle needs to be reduced based on vehicle information obtained from the vehicle,
   display the first image on the display when the amount of the information of the first image does not need to be reduced, and
   extract and display a second image corresponding to the first image in place of the first image on the display based upon a number of appearances of a keyword corresponding to the first image when the amount of the information of the first image needs to be reduced, an amount of information of the second image being smaller than the amount of the information of the first image,
   wherein display the second image corresponding to the first image in place of the first image on the display based upon the number of appearances of the keyword includes prioritizing display of an image corresponding to a first keyword over an image corresponding to a second keyword, a number of appearances of the first keyword being greater than a number of appearances than the second keyword.

2. The display control apparatus according to claim 1, wherein:
   the first image is a first text image indicating an appearance of a sentence; and
   the second image is a second text image indicating an appearance of a sentence obtained by summarizing the sentence.

3. The display control apparatus according to claim 1, wherein:
   the first image is a first picture image indicating an image of at least one of a shape, a diagrammatic figure and a video image other than a text; and
   the second image is a second picture image indicating an image obtained by summarizing the image of at least one of a shape, a diagrammatic figure, and a video image other than a text.

4. The display control apparatus according to claim 1, wherein the circuitry is configured to:
   determine whether or not a second image group composed of a plurality of the second images that are sorted out into a plurality of categories includes one corresponding to the first image, and
   display the second image corresponding to the first image on the display.

5. The display control apparatus according to claim 1, wherein the circuitry is configured to determine whether or not the amount of the information of the first image needs to be reduced using the vehicle information and a classifier that classifies a feature value of an image.

6. The display control apparatus according to claim 5, wherein the classifier is composed of a pre-trained neural network.

7. The display control apparatus according to claim 1, wherein the circuitry is configured to extract and display a plurality of second images corresponding to the first image in place of the first image on the display when the amount of the information of the first image needs to be reduced.

8. The display control apparatus according to claim 1, wherein the vehicle information includes vehicle speed.

9. The display control apparatus according to claim 8, wherein
the amount of the information of the first image does not need to be reduced when the vehicle speed is less than a threshold, and
the amount of the information of the first image needs to be reduced when the vehicle speed is greater than or equal to the threshold.

10. The display control apparatus according to claim 9, wherein the circuitry is configured to change the amount of the information of the second image stepwise or continuously according to the vehicle speed.

11. The display control apparatus according to claim 8, wherein the circuitry is configured to change the amount of the information of the second image stepwise or continuously according to the vehicle speed.

12. The display control apparatus according to claim 1, wherein the vehicle information includes a state of a parking brake.

13. The display control apparatus according to claim 1, wherein the vehicle information includes information acquired from an advanced driver-assistance system.

14. The display control apparatus according to claim 1, wherein the vehicle information includes a steering state of a steering apparatus.

15. The display control apparatus according to claim 1, wherein the vehicle information includes a state of brake operation.

16. A display control apparatus that displays an image on a display equipped on a vehicle, the display control apparatus comprising:
circuitry configured to:
determine whether or not an amount of information of a first text image indicating an appearance of a sentence to be displayed on the display equipped on the vehicle and a first picture image indicating an image of at least one of a shape, a diagrammatic figure, and a video image other than a text to be displayed on the display unit needs to be reduced based on vehicle information obtained from the vehicle,
display the first text image and the first picture image on the display when the amount of the information of the first text image and the first picture image does not need to be reduced, and
extract and display a second text image that indicates the appearance of the sentence to be displayed on the display and corresponds to the first text image in place of the first text image and a second picture image that indicates the image of at least one of a shape, a diagrammatic figure, and a video image other than a text to be displayed on the display and corresponds to the first picture image in place of the first picture image on the display based upon a number of appearances of a keyword corresponding to at least one of the first text image and the first picture image when the amount of the information of the first text image and the first picture image needs to be reduced, an amount of information of the second image being smaller than an amount of information of the first text image, and an amount of information of the second picture image being smaller than an amount of information of the first picture image,
wherein display the second text image corresponding to the first text image in place of the first text image and the second picture image corresponding to the first picture image in place of the first picture image on the display based upon the number of appearances of the keyword includes prioritizing display of a text image and a picture image corresponding to a first keyword over a text image and a picture image corresponding to a second keyword, a number of appearances of the first keyword being greater than a number of appearances than the second keyword.

17. A non-transitory storage medium storing a display control program that, when executed by a computer, cause the computer to perform functions comprising:
determining whether or not an amount of information of a first image to be displayed on a display equipped on a vehicle needs to be reduced based on vehicle information obtained from the vehicle;
displaying the first image on the display when the amount of the information of the first image does not need to be reduced; and
extracting and displaying a second image corresponding to the first image in place of the first image on the display based upon a number of appearances of a keyword corresponding to the first image when the amount of the information of the first image needs to be reduced, an amount of information of the second image being smaller than the amount of the information of the first image,
wherein displaying the second image corresponding to the first image in place of the first image on the display based upon the number of appearances of the keyword includes prioritizing displaying an image corresponding to a first keyword over an image corresponding to a second keyword, a number of appearances of the first keyword being greater than a number of appearances than the second keyword.

18. A display control method that displays an image on a display equipped on a vehicle, the display method comprising:
determining whether or not an amount of information of a first image to be displayed on a display equipped on a vehicle needs to be reduced based on vehicle information obtained from the vehicle;
displaying the first image on the display when the amount of the information of the first image does not need to be reduced; and
extracting and displaying a second image corresponding to the first image in place of the first image on the display based upon a number of appearances of a keyword corresponding to the first image when the amount of the information of the first image needs to be reduced, an amount of information of is the second image being smaller than the amount of the information of the first image,
wherein displaying the second image corresponding to the first image in place of the first image on the display based upon the number of appearances of the keyword includes prioritizing displaying an image corresponding to a first keyword over an image corresponding to a second keyword, a number of appearances of the first keyword being greater than a number of appearances than the second keyword.

* * * * *